United States Patent
Sawada et al.

(10) Patent No.: US 7,099,044 B2
(45) Date of Patent: Aug. 29, 2006

(54) COLOR IMAGE PROCESSING APPARATUS AND METHOD AND COLOR IMAGE FORMING APPARATUS AND METHOD

(75) Inventors: Takayuki Sawada, Tokyo (JP); Shinsaku Ito, Yokohama (JP)

(73) Assignees: Kabushiki Kaisha Toshiba, Tokyo (JP); Toshiba TEC Kabushiki Kaisha, Tokyo (JP)

( * ) Notice: Subject to any disclaimer, the term of this patent is extended or adjusted under 35 U.S.C. 154(b) by 65 days.

(21) Appl. No.: 11/016,982

(22) Filed: Dec. 21, 2004

(65) Prior Publication Data

US 2005/0099643 A1 May 12, 2005

Related U.S. Application Data (63) Continuation of application No. 09/645,589, filed on Aug. 25, 2000, now Pat. No. 6,888,646.

(30) Foreign Application Priority Data

Aug. 27, 1999 (JP) ................................. 11-242119

(51) Int. Cl.
- *G06K 15/00* (2006.01)
- *G06K 9/00* (2006.01)
- *H04N 1/46* (2006.01)

(52) U.S. Cl. ................. 358/1.9; 382/165; 382/167; 358/504; 358/518; 358/521

(58) Field of Classification Search ............... 382/162, 382/167, 165; 358/1.9, 2.1, 3.1, 504, 518, 358/521

See application file for complete search history.

(56) References Cited

U.S. PATENT DOCUMENTS

| | | | |
|---|---|---|---|
| 5,319,433 A | 6/1994 | Fukushima et al. | |
| 5,546,165 A | 8/1996 | Rushing et al. | |
| 5,754,683 A | 5/1998 | Hayashi et al. | |
| 5,856,876 A | 1/1999 | Sasanuma et al. | |
| 6,160,912 A * | 12/2000 | Usami | 382/167 |
| 6,204,873 B1 | 3/2001 | Shimazaki | |
| 6,654,494 B1 | 11/2003 | Sawada et al. | |
| 6,721,062 B1 | 4/2004 | Sawada et al. | |
| 2001/0015815 A1* | 8/2001 | Hada et al. | 358/1.9 |

FOREIGN PATENT DOCUMENTS

| | | | |
|---|---|---|---|
| JP | 64-41375 | * | 2/1989 |
| JP | 2001-260407 A | | 9/2001 |

* cited by examiner

*Primary Examiner*—Jerome Grant, II
(74) *Attorney, Agent, or Firm*—Foley & Lardner LLP (57) ABSTRACT

A color image processing apparatus includes at least patch image output units which output patch image data, based on patch data in a storage area, a patch data extractor which extracts read patch data by reading a patch image formed according to the patch image data, using a color scanner, a patch data processor which estimates the record gradation of patch data, based on the read patch data, and a gradation corrector which corrects a color image signal, based on the estimated record gradation and patch data. The apparatus provides gradation correction based on gradation estimated from patch data, thus making it possible to reproduce gradation and color well.

20 Claims, 7 Drawing Sheets

COLOR IMAGE PROCESSING APPARATUS AND METHOD AND COLOR IMAGE FORMING APPARATUS AND METHOD

CROSS-REFERENCE TO RELATED APPLICATIONS

This application is a continuation of U.S. patent application Ser. No. 09/645,589, filed on Aug. 25, 2000 now U.S. Pat. No. 6,888,646; this parent application is hereby incorporated by reference. This application is also is based upon and claims the benefit of priority from the prior Japanese Patent Application No. 11-242119, filed Aug. 27, 1999. The entire contents of the priority document are incorporated herein by reference.

BACKGROUND

The present invention relates to a color image processing apparatus, and more particularly, to a color image processing apparatus which adjusts parameters for image processing, using a patch image.

Image forming apparatuses, such as copying machines and printers, have recently been adapted to mainly do color printing. Accordingly, print color is required to have precisely specified gradation characteristics. For example, a copying machine performs color conversion to convert RGB image data input from a scanner to CMY image data to be output on a printer using color material. To duplicate an image so that the original tone of color is faithfully reproduced, color conversion characteristics (color conversion parameters and a color conversion table) must be adjusted properly.

To duplicate a color image faithfully, gradation characteristics must also be adjusted properly. When passing through a sensor or a filter, image data input from a scanner suffers distortion for R, G, and B. When a printer is provided with the same image data, images which differ in gradation and color are output from time to time due to different environments (different temperatures and humidities), time-dependent changes, and differences between individual products. Especially because the gradation characteristics of a printer sensitively change in response to various factors, a mechanism which properly adjusts the output gradation characteristics and color conversion characteristics of the printer must be installed in the printer to keep reproducing an image well.

A method for determining color conversion parameters is known which collects multicolor patch RGB-CMY data pairs by making an apparatus to read a color patch sample output therefrom and finds by the least-square method the coefficient of each term of a polynomial for converting RGB data to CMY data. The method, which considers image processor characteristics other than color conversion to be like a black box, is based on the idea that ideally, an image can be reproduced faithfully only by color conversion, because black box inverse corrections are made using color conversion.

A method is also known in which color conversion parameter settings are fixed under an assumption and adjusts output gradation characteristics in the same way as previously described. That is, the method collects multigradation patch C', −C, M', −M, Y', and −Y data pairs by making an apparatus to read a color patch sample output therefrom and finds by the least-square method the coefficient of each term of gradation correction equations for C, M, and Y.

However, it is difficult to output an image with satisfactorily reproduced gradation and color even using the above-described adjusting methods. This is because image processing performed by equipment from a scanner to a printer comprises the steps of color conversion, blackening, gradation processing (quasi intermediate gradation processing), screen processing, etc. in which image data suffers nonlinear distortion with different characteristics.

Thus, a problem with conventional image forming apparatuses it that it is difficult to generate all parameters at a time which are used for correcting nonlinear distortion due to color conversion, blackening, gradation processing, screen processing, etc.

Another problem with conventional equipment is that it is difficult to correctly estimate record gradation for characteristics of individual equipment and incorporate the estimated record gradation into parameters for processing of individual signals.

SUMMARY

It is an object of the present invention to provide a color image processing apparatus and a color image forming apparatus which output a color image with well-reproduced gradation and color reproducibility by estimating record gradation or the like using patch image data and incorporating it in parameters.

According to the present invention, a color image processing apparatus comprising: patch image output means for outputting patch image data generated from patch data stored in storage areas; patch data extracting means for receiving read data obtained by reading, by means of a scanner, a patch image represented by the patch image data output by the patch image output means; gradation estimating means for estimating the record gradation of the patch data, from the read patch data extracted by the patch data extracting means; and correction output means for correcting an input color image signal on the basis of the record gradation estimated by the gradation estimating means and the patch data stored in the storage area, and for outputting the corrected signal.

According to the present invention, using such an arrangement, record gradation is estimated from patch data extracted from read patch data, that is, patch data which is output and then captured, using a scanner or the like. By doing so, tables for correcting image processing, taking into account a gradation characteristic tendency unique to equipment are created, thus providing a color image processing apparatus which makes it possible to make fine gradation corrections for individual equipment.

According to the present invention, a color image processing apparatus comprising: first patch image output means for outputting first patch image data on the basis of the first patch data for creating a pulse width selection table stored in the first storage area; first patch data extracting means for reading, using a scanner, a first patch image represented by first patch image data output by the first patch image output means, and for extracting first patch data in accordance with the first patch image; first gradation estimating means for estimating the record gradation of the first read patch data, from on the first read patch data extracted by the first patch data extracting means; pulse width selection table setting means for setting a pulse width selection table on the basis of the record gradation of the first read patch data estimated by the first gradation estimating means and the first patch data; second patch image output means for outputting second patch image data, using the pulse width selection table set by the pulse width selection table setting means and on the basis of the second patch data for creating a gradation correction table stored in the second storage area; second patch data extracting means for reading, using a scanner, a second patch image represented by second patch image data output by the second patch image output means, and for extracting second patch data in accordance with the second patch image; second gradation estimating means for estimating the record gradation of the second read patch data on the basis of the second read patch data extracted by the second patch data extracting means; gradation correction table setting means for setting a gradation correction table on the basis of the record gradation of the second read patch data estimated by the second gradation estimating means and the second patch data; third patch image output means for outputting third patch image data, using the pulse width selection table set by the pulse width selection table setting means and the gradation correction table set by the gradation correction table setting means and on the basis of the third patch data for creating a color conversion table stored in the third storage area; second patch data extracting means for reading, using a scanner, a third patch image represented by third patch image data output by the third patch image output means, and for extracting third patch data according to the third patch image; color conversion table setting means for setting a color conversion table on the basis of the third read patch data extracted by the third patch data extracting means and the third patch data; and correction output means for correcting a given and input color image signal on the basis of the pulse width selection table set by the pulse width selection setting means, the gradation correction table set by the gradation correction table setting means, and the color conversion table set by the color conversion table setting means, and for outputting the corrected signal.

According to the present invention, based on gradation estimated in such a way, image processing tables, that is, pulse width selection, gradation correction, and color conversion tables are created one after another. By doing so, the adjustable parameter tables can be dispersively provided at a plurality of key points in an image processing flowchart to create each table according to a relatively simple target or rule, so that a color image processing apparatus can be provided which feeds a color image with well-reproduced gradation and color.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION

Referring now to the drawings, embodiments of the present invention are described below.

Configuration and Operation of Image Processor

A configuration of an image processor 36 which corrects characteristics, using a patch image, and characteristic correction by the processor are hereafter described in detail.

Figure 1:
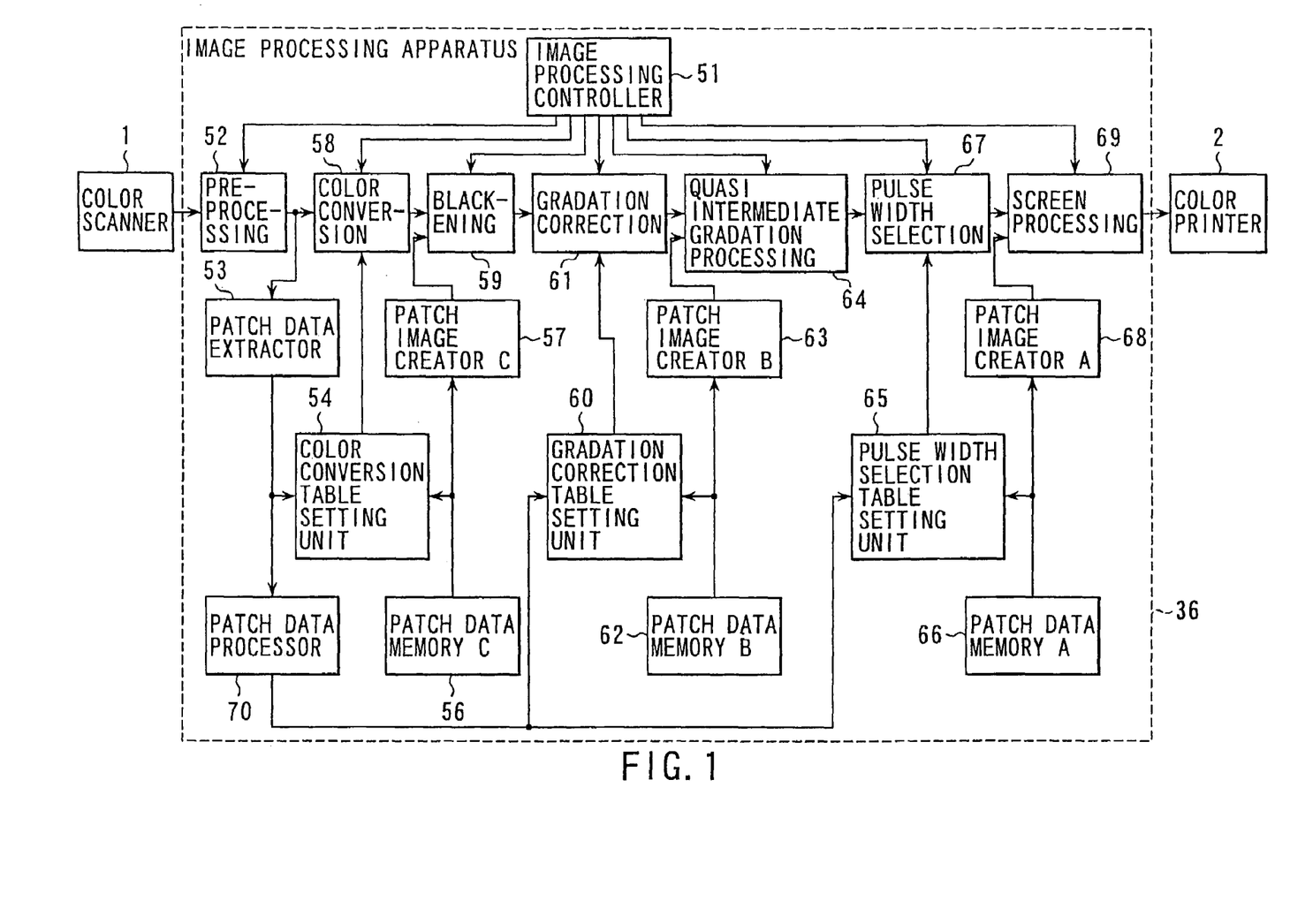
FIG. 1 is a block diagram illustrating a configuration of an image processor according to the present invention.

FIG. 1 is a block diagram illustrating the configuration of the image processor according to the present invention. As shown in FIG. 1, the image processor 36 according to the present invention, which is connected with a color scanner 1 and color printer 2 when used, consists of the following components connected together: (a) an image processing controller 51; (b) a preprocessor 52; (c) a patch data extractor 53; (d) a color conversion table setting unit 54; (e) patch data memory C 56; (f) a patch image creator C 57; (g) a color converter 58; (h) a blackening unit 59; (i) a gradation correction table setting unit 60; (j) a gradation corrector (output γ corrector) 61; (k) patch data memory B 62; (l) a patch image creator B 63; (m) a quasi intermediate gradation processor 64; (o) a pulse width selection table setting unit 65; (p) patch data memory A 66; (q) a pulse width selector 67; (r) a patch image creator A 68; (s) a screen processor 69; and (t) a patch data processor 70, or the hub of the present invention.

The function of each component is described according to a ordinary flow of data as observed when an image is duplicated by a digital copying machine using the image processor. At first, the RGB image data on an original read by the color scanner 1 is input to the preprocessor 52. The preprocessor 52 makes shading and input γ corrections to the image data fed from the scanner. The color converter 58 converts the input image data, expressed by RGB color space, to image data expressed by CMY color space. The blackening unit 59 calculates the amount of black-color material (K) from the CMY data (blackening material creation) and corrects the amount of CMY according to the value of K (black-color replacement).

After blackening, the output γ corrector 61 makes a gradation correction to the CMY image data for each color channel. The quasi intermediate gradation processor 64 performs quasi intermediate gradation processing, such as multivalue error expansion. For example, a 16-value recording system performs 16-value error expansion. In this case, each image data pixel output only takes 16 values from 0 to 15, expressed using 4 bits. The pulse width selector 67 selects the pulse width of a recording laser drive signal for each of levels 0 to 15. The screen processor 69 converts the image data, converted to a pulse width signal, to a recording pattern which is given a screen angle for each color channel. The color printer (recording engine) 2 outputs the image subjected to screen processing onto paper. Other blocks in FIG. 1 are described below together with table creation.

Structure of Digital Copying Machine Using Image Processor

Figure 4:
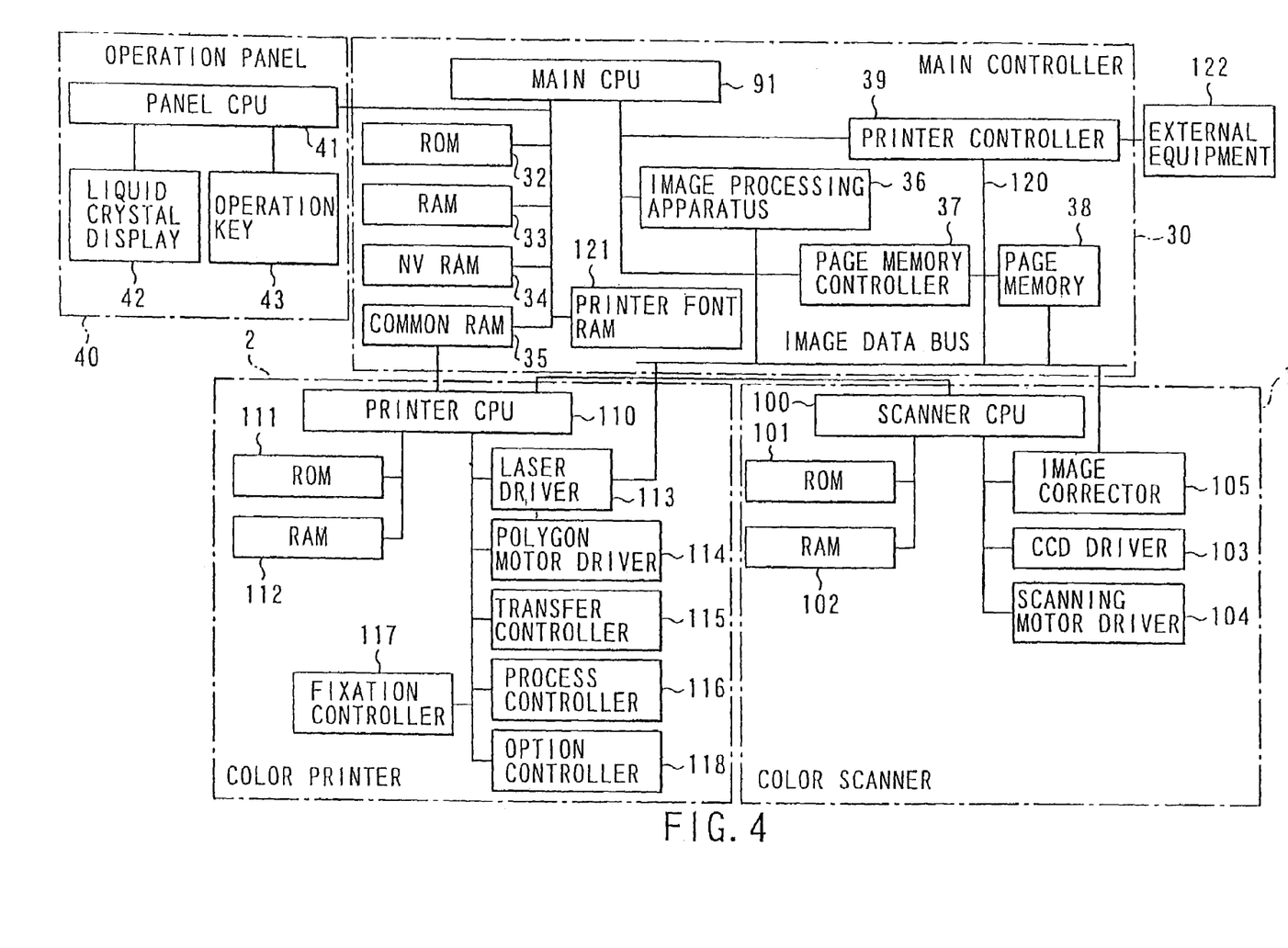
FIG. 4 is a block diagram illustrating an example of an image forming apparatus using an image processing apparatus according to the present invention.

The structure and operation of a digital copying machine is described below which uses the above-described image processor of the present invention. FIG. 4 is a block diagram schematically illustrating electrical connections and a control signal flow in a digital copying machine according to the present invention. In FIG. 4, a control system consists of three CPUs: a main CPU (central processing unit) 91 in a main controller 30, a scanner CPU 100 in the color scanner 1, and a printer CPU 110 in the color printer 2.

The main CPU 91 bi-directionally communicates through common RAM (random access memory) 35 with the printer CPU 110. The main CPU 91 issues an operational direction to the printer CPU, and the printer CPU 110 returns a status to the main CPU 91. The printer CPU 110 and scanner CPU 100 have serial communications with each other. The printer CPU 110 issues an operational direction to the scanner CPU 100, and the scanner CPU 100 returns a status to the printer CPU 110.

An operation panel 40, which has a liquid crystal display 42, operation keys 43, and a panel CPU 41 connected with the display 42 and keys 43, is connected with the main CPU 91.

The main controller 30 consists of: (a) the main CPU 91; (b) ROM (read-only memory) 32; (c) RAM 33, NVRAM 34; (d) the common RAM 35; (e) the image processor 36; (f) a page memory controller 37; (g) page memory 38; (h) a printer controller 39, and (i) printer font ROM 121.

The main CPU 91 controls the entire system. A control program and the like are stored in the ROM 32. The RAM 33 temporarily stores data.

The NVRAM 34, nonvolatile random access memory backed up by a battery (not shown), maintains stored data if the power is turned off.

The common RAM 35 is used for bi-directional communications between the main CPU 91 and printer CPU 110.

The page memory controller 37 stores image information in the page memory 38 and reads it therefrom. The page memory 38, with an area sufficient to store a plurality of pages of image information, is adapted so that data into which image data from the color scanner 1 is compressed can be stored for each page.

Font data corresponding to print data is stored in the printer font ROM 121. The printer controller 39 expands print data from external equipment 122, such as a personal computer, into image data at a resolution equivalent to resolution data included in the print data, using font data stored in the printer font ROM 121.

The color scanner 1 comprises: (a) the scanner CPU 100, which controls the entire system; (b) ROM 101 in which a control program and the like are stored; (c) RAM 102 for storing data; (d) a CCD driver 103 which drives a color image sensor (not shown); (e) a scanning motor driver 104 which controls rotation of a scanning motor moving a first carriage; and (f) an image corrector 105.

The image corrector 105 comprises: (a) an analog-digital converting circuit which converts R, C, and B analog signals output from the color image sensor to digital signals; (b) a shading correcting circuit which corrects variations in the threshold level relative to an output signal from the color image sensor due to color image sensor variations, an ambient temperature change, or the like; and (c) line memory which temporarily stores a digital signal subjected to shading correction which is fed from the shading correction circuit.

The color printer 2 comprises: (a) the printer CPU 110 which controls the entire system; (b) ROM 111 in which a control program and the like are stored; (c) RAM 112 for storing data; (d) a laser driver 113 which drives a semiconductor laser oscillator (not shown); (e) a polygon motor driver 114 which drives a polygon motor (not shown) of an exposure apparatus (not shown); (f) a transfer controller 115 which controls transfer of paper (not shown) by a transfer mechanism (not shown); (g) a process controller 116 which controls a process of charging, development, and transcription performed using a charging apparatus (not shown), a developing roller (not shown), and a transfer apparatus (not shown); (h) a fixation controller which controls a fixing apparatus (not shown); and (i) an option controller 118 which controls an option.

The image processor 36 which has a function characterizing the present invention, page memory 38, printer controller 39, image corrector 105, and laser driver 113 are connected together using an image data bus 120.

Processing Performed by Image Processor Using Patch Image

Referring now to the drawings, processing which is performed by an image processor of the present invention, using a patch image as hereafter described in detail.

Figure 5:
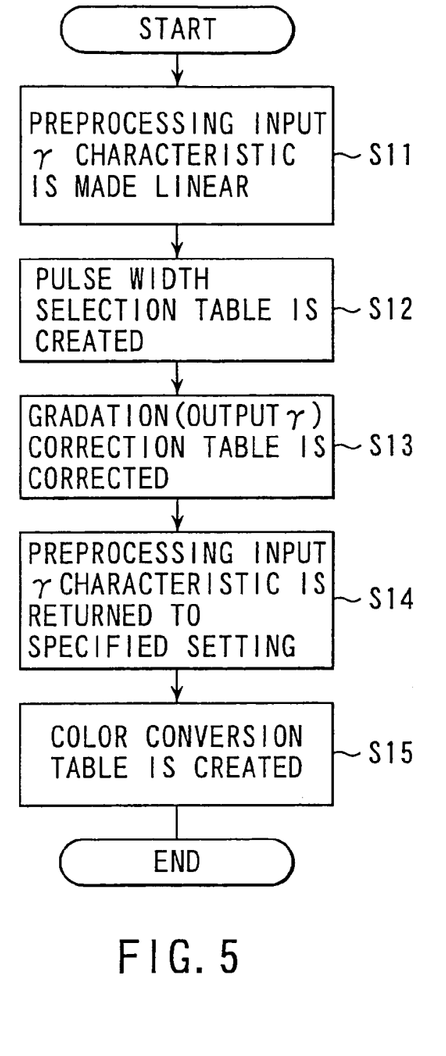
FIG. 5 is flowchart generally illustrating execution of the present invention.

FIG. 5 is a flowchart illustrating a series of steps in which image processing parameter tables of the present invention are created.

In an embodiment of the present invention, the above-described image processor creates the pulse width, gradation correction, and color conversion tables in the order shown in FIG. 5. That is, first, preprocessing input γ characteristics are made linear (S11), and then the pulse width selection table is created using, for example, a patch table (S12). Next, the gradation correction table is created based on the pulse width selection table obtained, using a patch image, for example (S13). Finally, the color correction table is created based on the gradation correction table obtained, using, for example, a patch image (S14). In the embodiment, the tables are sequentially created, one which has the lowest degree of freedom and can be created according to the simplest policy first, and moreover, the following table is based on the preceding table. This allows an input image to be reproduced correctly although a simple creating method does not.

Referring to a flowchart, steps in which the three tables are created using patch images are described in detail below.

Figure 6:
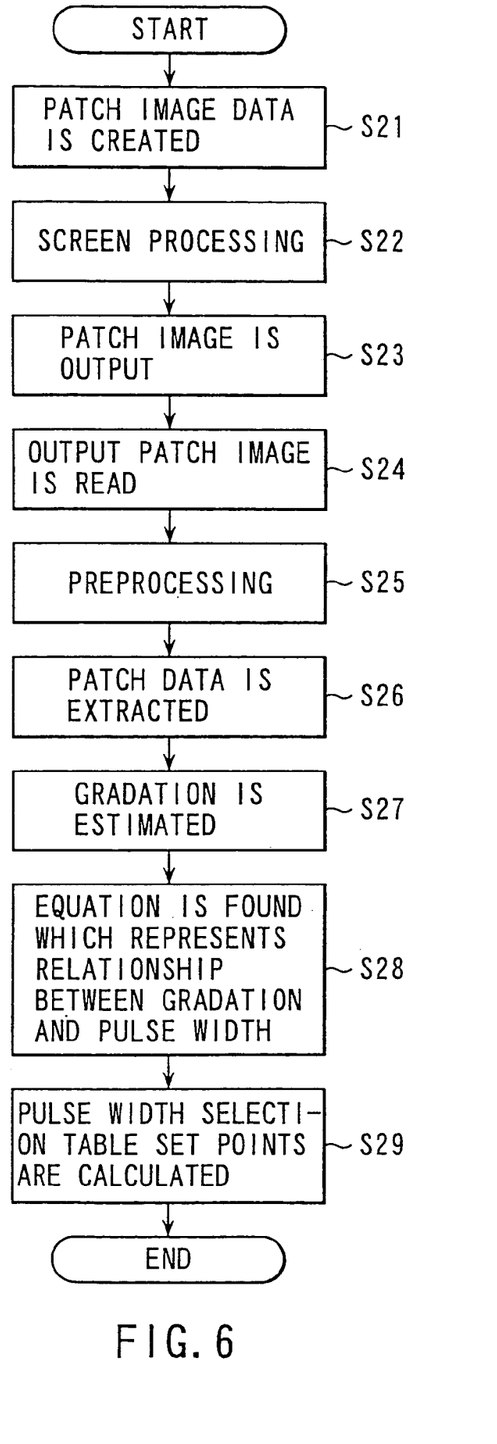
FIG. 6 is a flowchart for creating a pulse width selection table.
Figures 9, 10:
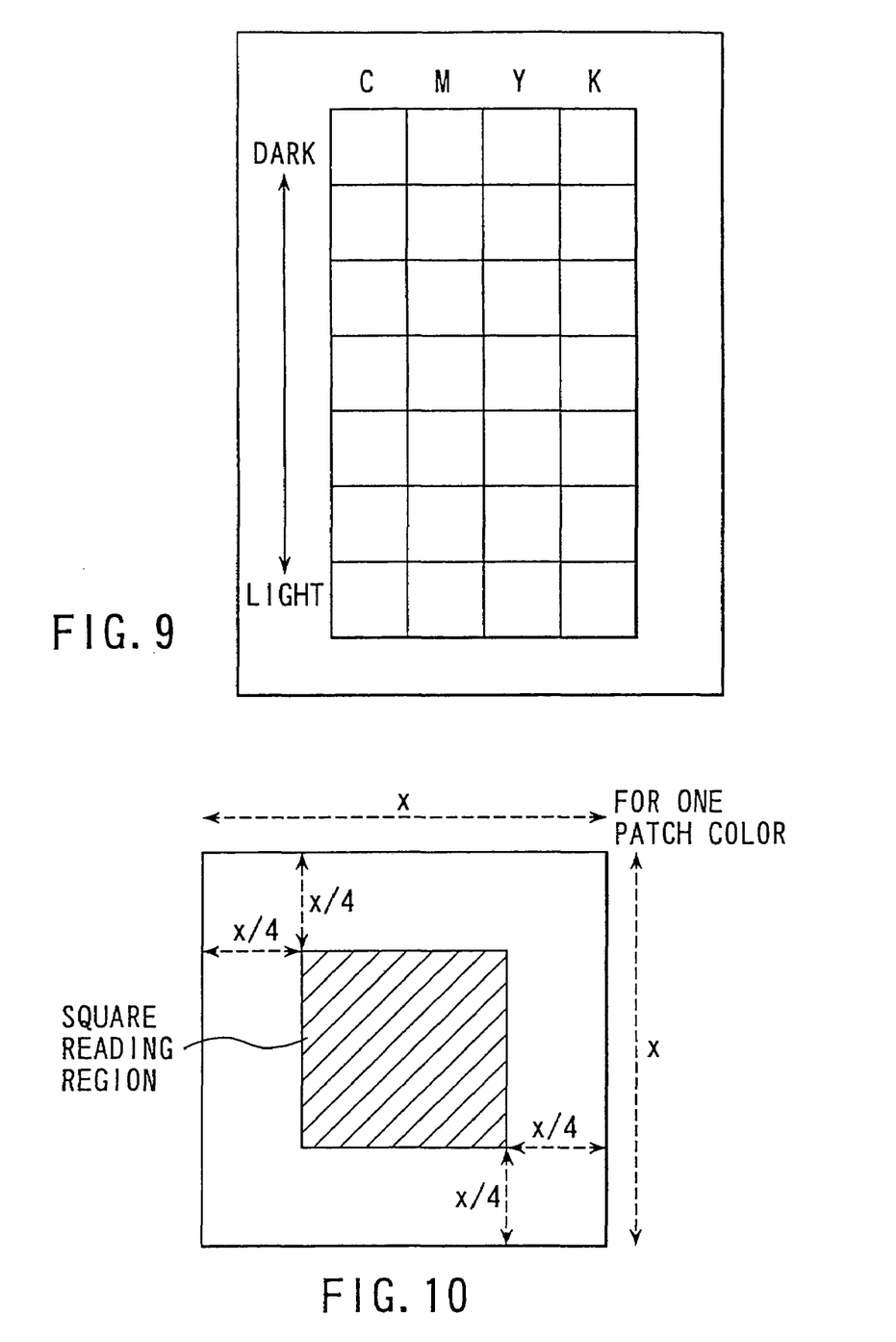
FIG. 9 is a plan view showing patch images for creating a pulse selection table and a gradation correction table.
FIG. 10 illustrates data sampling from one patch.

FIG. 6 shows a pulse selection table creating flowchart. First, a patch image for creating a pulse width selection table is output (S21). Patch data for creating a pulse width selection table is stored in patch data memory A 66. The patch data, representing pulse widths, is set so that a plurality of patches are laid out which are provided by changing the pulse widths at regular intervals for C, M, Y, and K. The patch image creator A 68 creates patch image data for creating a pulse width selection table, using the patch data. FIG. 9 shows an example of a patch image configuration. The patch image data is fed to the screen processor 69 (S22). In response to a control signal from the image processing controller 51, the screen processor 69 selects image data from the patch image creator A 68 as input. After subjected to screen angle processing, the patch image data is output onto paper (S23). The output patch image for creating a pulse width selection table is read by the scanner 1 (S24).

In this case, using the image processing controller, the input γ characteristics of the preprocessor 52 are changed so that they are linear, not as usual (S25). The reason why this step is taken is as follows. It is desirable that patch data read be directly proportional to the quantity of light reflected from a patch image to estimate record gradation (for example, the area rate) from the patch data read using a patch data processor 70, described later. However, it is sometimes desirable that the input γ characteristics be directly proportional to a power of the quantity of light reflected. After subjected to preprocessing, patch image data input from the scanner is fed to the patch data extractor 53. Based on preset information on patch print layout, the patch data extractor 53 samples pixel data to extract the R, G, and B values of each patch (S26). To cancel the effect of noise, many pixels in rectangular formation are cut out of the middle of a patch, and the total of them is calculated. Each of the R, G, and B values is divided by the number of pixels cut to take an average (see FIG. 10). From the extracted patch data, the record gradation of the patch image is estimated (S27).

Record gradation can be estimated by various methods. For example, at least three methods are conceivable. The first method finds the C, M, Y, and K area rates. The second finds both record area rate and record density and selects either as required. And, the third sets a plurality of levels of record gradation and estimates gradation, referring to a reference table which is created for each record gradation level. In addition, various modified methods are available.

First, a method which finds the record area rate is described below. The C, M, Y, and K record area rates of a patch image are estimated using the following:

$$C = 255 - R$$

$$M = 255 - G$$

$$Y = 255 - B$$

$$K = 255 - (R+G+B)/3 \quad (1)$$

where R, G, B, C, M, Y, and K are each expressed using eight bits (S27).

Finally, the pulse width selection table setting unit creates a pulse width selection table, based on the estimated area rate and patch data which is stored in the patch data memory A. The relationship between the estimated area rate and pulse width is approximately found as the polynomial of n-th degree named Expression 2 (S28). The least-square method is used to calculate coefficients $a_k$ in Expression 2.

$$P = \sum_{k=0}^{n} a_k x^k \quad (2)$$

(x: area rate, p: pulse width)

Figure 11:
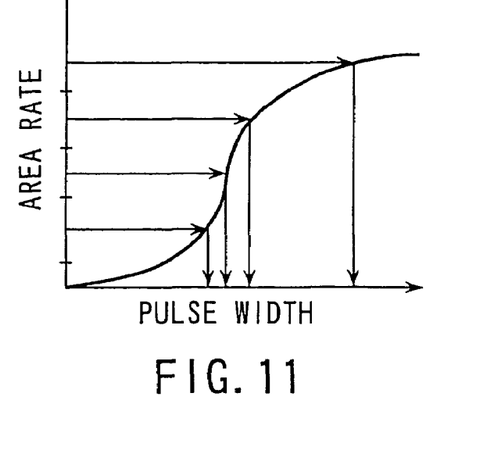
FIG. 11 is a graph showing an example of a relationship between the area rate calculated by polynomial approximation and pulse width.

FIG. 11 shows an example of a curve representing the relationship between the estimated area rate and pulse width. Pulse selection table values are calculated by dividing the area rate axis into as many equal segments as recorded values (for 16-value error expansion, the axis is divided into 16 equal segments) and finding the pulse width corresponding to each division point using Expression 2 (S29).

Although the number of gradation levels is limited to, for example, 16, a pulse width selection table is created according to a simple, easy-to-keep rule that a laser drive pulse width is assigned so that the record area rate linearly changes for each level (that is, each of the limited number of gradation levels represents an area rate), as described above. This makes it possible to keep good gradation resolution over the entire density range, thus reproducing gradation without density breaks or density skips.

Figure 2:
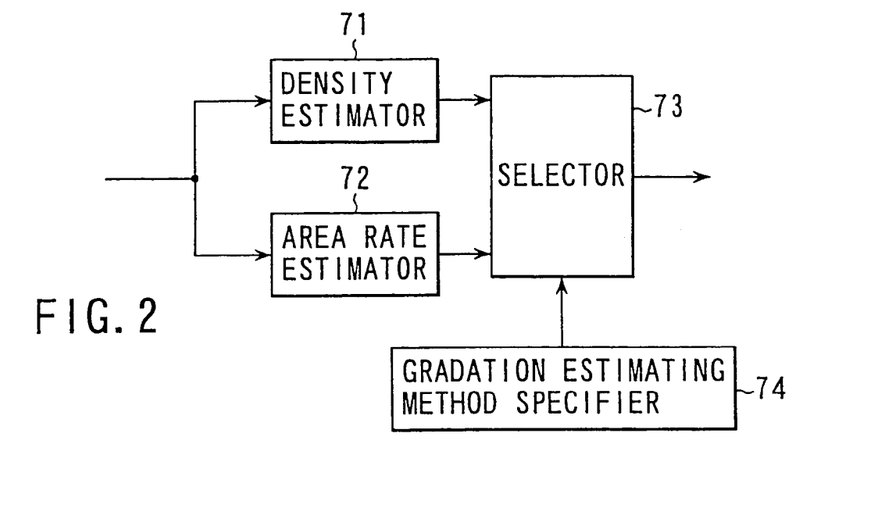
FIG. 2 is a block diagram illustrating a configuration of a patch data processor according to the present invention.

Below is described the way to find both record area rate and record density and select either as required. FIG. 2 shows an example of the patch image processor 70, which consists of a density estimator 71, an area rate estimator 72, and a selector 73 which receives output from the density estimator and area rate estimator and selects the record area rate or record density as specified by a gradation estimating method specifier 74. For this configuration, processing performed by the density estimator 71 is represented by the following:

$$C = -\log_{10}(R/255)$$

$$M = -\log_{10}(G/255)$$

$$Y = -\log_{10}(B/255)$$

$$K = -\log_{10}[(R+G+B)/3/255] \quad (3)$$

where R, C, B, C, M, Y, and K are each expressed using eight bits.

The selector 73 selects the estimated density obtained using the above-described equation and estimated area rate as specified by the gradation estimating method specifier 74. Then, the pulse width selection table setting unit 65 sets a pulse width selection table in the same way as described above.

Figure 3:
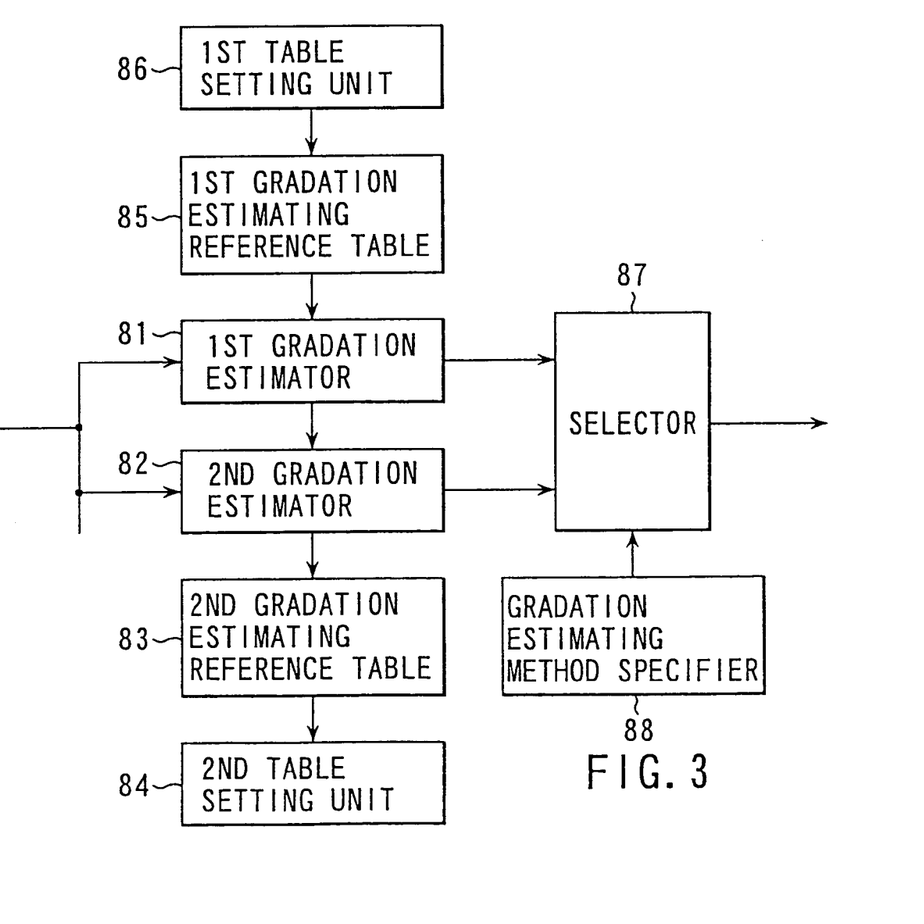
FIG. 3 a block diagram illustrating another configuration of the patch data processor according to the present invention.

Using FIG. 3, below is described a way to set a plurality of levels of record gradation and estimate gradation, referring to a reference table which is created for each record gradation level. As shown in FIG. 3, first and second gradation estimators 81 and 82 each have: (a) a first gradation estimating reference table 85; (b) first table setting means 86 which make settings in the first gradation estimating reference table; (c) a second gradation estimating reference table 83; and (d) second table setting means 84 which make settings in the second gradation estimating reference table. The selector 87 receives output from the first and second gradation estimators 81,82 and outputs either as specified by the gradation estimating method specifier 88.

The first and second gradation estimators 81 and 82 may be the above-described density estimator 71, area rate estimator 72, or other record gradation estimating means. The gradation estimating reference tables 85 and 83 can be set at will by the gradation table setting units 86 and 84. Such a configuration makes it possible to provide an image processor materializing a digital copying machine with higher gradation reproducibility by switching between a plurality of gradation estimators according to use condition.

Figure 7:
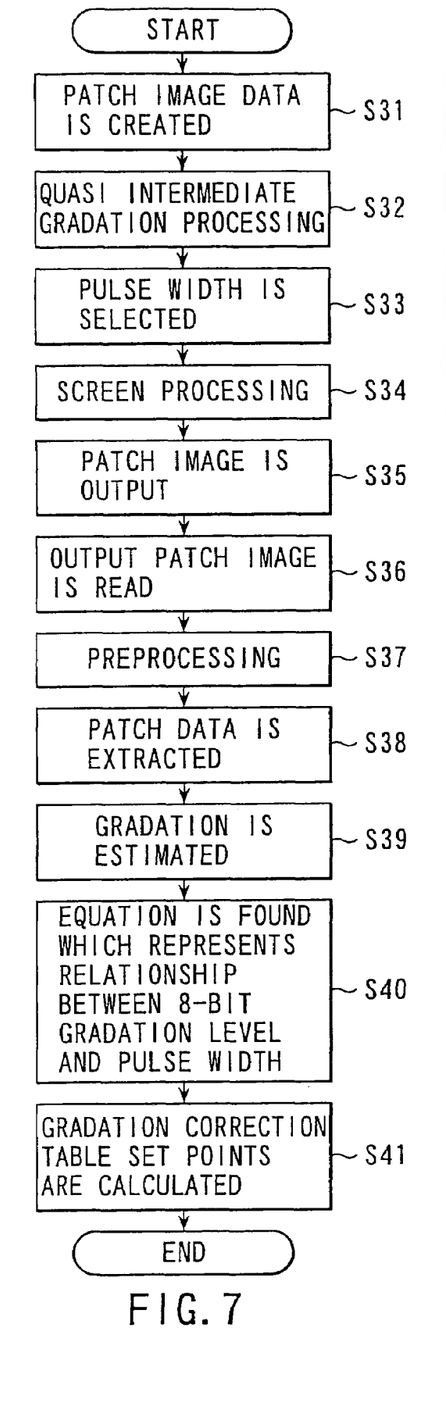
FIG. 7 is a flowchart for creating a gradation correction table.

Using the gradation correction table creating flowchart in FIG. 7, a procedure for setting a gradation correction table is described below. First, a patch image for creating a gradation correction table is output. Patch data for creating a gradation correction table is stored in the patch data memory B 62. The patch data, representing 8-bit gradation levels to be fed to the quasi intermediate gradation processor 64, is set so that a plurality of patches are laid out which are provided by changing the gradation levels at regular intervals for C, M, Y, and K. The patch image creator B 63 creates patch image data for creating a gradation correction table, using the patch data (S31). The layout of patch images is almost the same as in FIG. 9.

The patch image data is fed to the quasi intermediate gradation processor 64. In response to a control signal from the image processing controller 51, the quasi intermediate gradation processor 64 selects image data from the patch image creator B 63 as input. After subjected to quasi intermediate gradation processing (S32), pulse width selection occurs using the above-described set pulse width selection table (S33), and screen angle processing (S34), the patch image data is then output onto paper (S35).

The output patch image for creating a gradation correction table is read by the scanner (S36). In this case, using the image processing controller 51, the input γ characteristics of the preprocessor 52 are changed so that they are linear, not as usual. The reason is the same as with the above-described pulse width selection table creation. Patch image data input from the scanner is fed through the preprocessor 52 to the patch data extractor 53 (S37). Based on preset information on patch print layout, the patch data extractor 53 samples pixel data to extract the R, G, and B values of each patch (S38). To cancel the effect of noise, many pixels in rectangular formation are cut out of the middle of a patch, and the total of them is calculated. Each of the R, G, and B values is divided by the number of pixels cut to take an average (FIG. 10).

From the extracted patch data, the record gradation of the patch image is estimated (S39). As previously described, at least three methods for estimating record gradation, including those of FIGS. 2 and 3, are available: the first method which finds C, M, Y, and K area rates, the second which finds both record area rate and record density and selects either as required (see FIG. 2), and the third which sets a plurality of levels of record gradation and estimates gradation, referring to a reference table created for each record gradation level. In addition, as is the case with pulse width selection table setting, various methods are possible, including steps extracted from those methods (for example, a step of estimating record density only) and combinations of the steps.

Finally, the gradation correction table setting unit creates a gradation correction table, based on the estimated record gradation (for example, the area rate) and patch data which is stored in the patch data memory B (S41). The relationship between the estimated area rate and 8-bit output gradation level is approximately found as the polynomial of n-th degree named Expression 4. The least-square method is used to calculate coefficients $b_k$ in Expression 2 (S40).

$$L = \sum_{k=0}^{n} b_k x^k \quad (4)$$

(x: area rate, L: 8-bit output gradation level)

Figure 12:
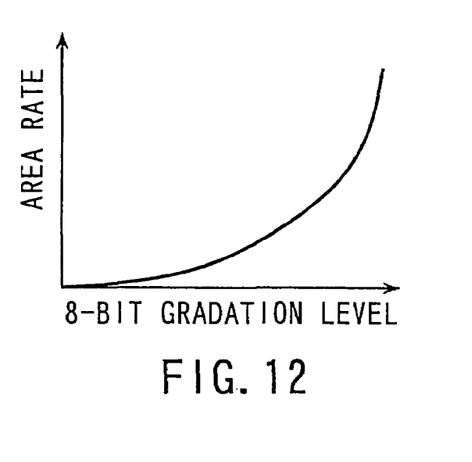
FIG. 12 is a graph showing an example of a relationship between the area rate calculated by polynomial approximation and 8-bit gradation level.

FIG. 12 shows an example of a curve representing the relationship between the 8-bit output gradation level and estimated area rate. Gradation correction table values are calculated by dividing the area rate axis into 256 equal segments and finding the 8-bit gradation level corresponding to each division point using Expression 4.

Figure 8:
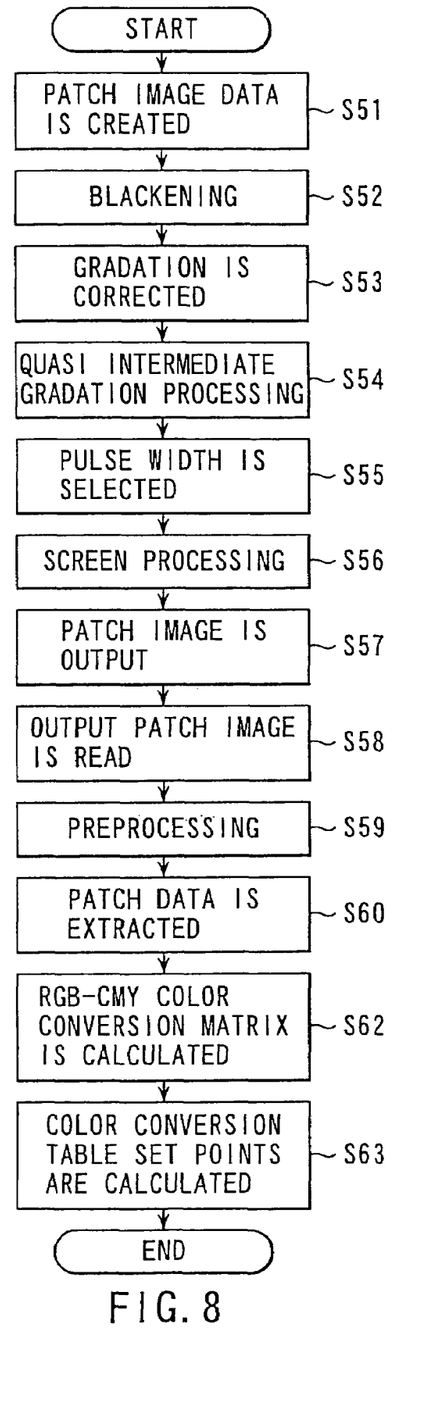
FIG. 8 is a flowchart for creating a color conversion table.

Finally, using the flowchart for creating a color conversion table of FIG. 8, a procedure for creating a color conversion table is described below. First, a patch image for creating color conversion table is output (S51). Patch data for creating a color conversion table is stored in the patch data memory C. The patch data, representing a 8-bit area rate each for C, M, and Y, is set so that a plurality of patches are laid out which are provided by combining C, M, and Y when the area rate is changed at regular intervals.

Figure 13:
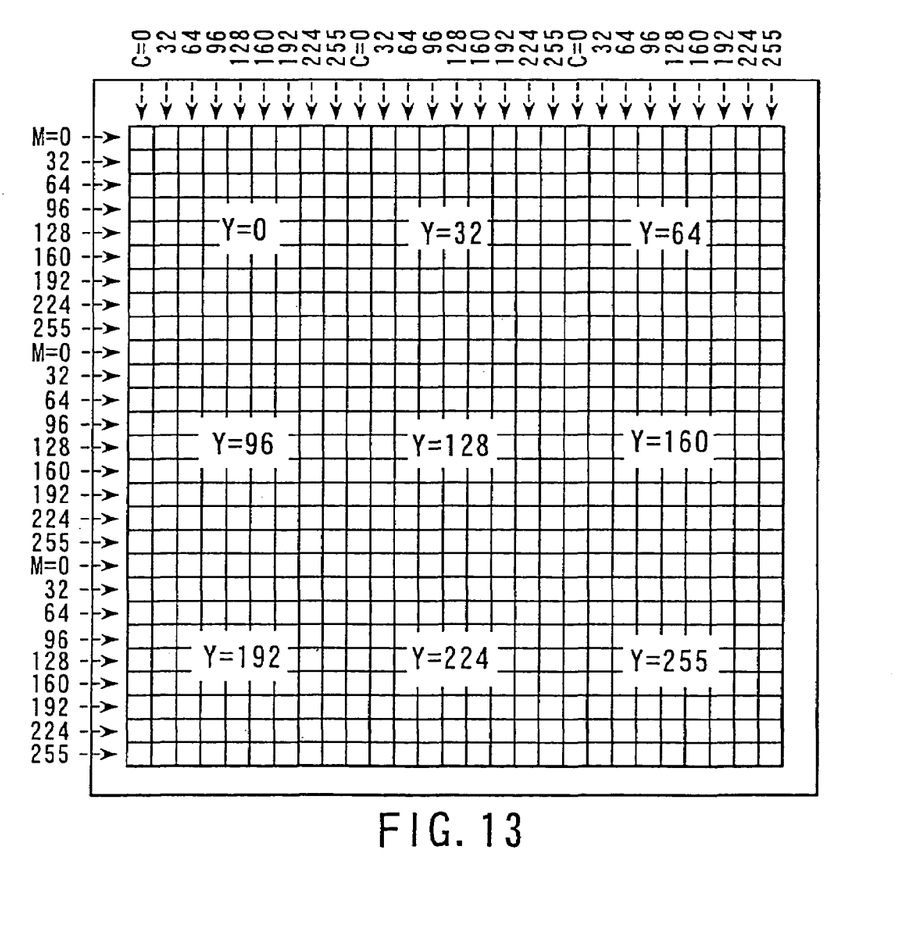
FIG. 13 is a plan view showing an example of patch image for creating a color conversion table.

The patch image creator C 57 creates patch image data for creating a color conversion table, using the patch data. FIG. 13 shows an example of arrangement of patches for creating a color conversion table. The patch image data is fed to the blackening unit 59. In response to a control signal from the image processing controller 51, the blackening unit 59 selects image data from the patch image creator C 57 as input. After subjected to blackening (S52), the following occur: gradation correction using the above-described set gradation correction table (S53), quasi intermediate gradation processing (S54), pulse width selection using the above-described set pulse width selection table (S55), and screen processing (S56). The patch image data is then output onto paper (S57). Then, the output patch image for creating a color conversion table is read by the scanner (S58). In this case, the input γ characteristics of the preprocessor are set for ordinary copying (S59). This is both because for color conversion, RGB data itself fed from the preprocessor is input and because starting the procedure shown by the table creation flowchart with the patch data representing the area rate eliminates the need for area rate estimation.

After subjected to preprocessing, patch image data input from the scanner is fed to the patch data extractor 53 (S60). Based on preset information on patch print layout, the patch data extractor 55 samples pixel data to extract the R, G, and B values of each patch. To cancel the effect of noise, many pixels in rectangular formation are cut out of the middle of a patch, and the total of them is calculated. Each of the R, G, and B values is divided by the number of pixels cut to take an average (FIG. 10).

Finally, the color conversion table setting unit 54 creates a color conversion table, based on the extracted patch data and patch data which is stored in the patch data memory C. The RGB-CMY color conversion relationship is approximately found as the matrix equation named Expression 5 (S62). The least-square method is used to calculate color conversion matrix elements $D_{ij}$ in Expression 5.

$$\begin{bmatrix} C \\ M \\ Y \end{bmatrix} = \begin{bmatrix} D_{00} & D_{01} & D_{02} & D_{03} & D_{04} & D_{05} & D_{06} & D_{07} & D_{08} & D_{09} \\ D_{10} & D_{11} & D_{12} & D_{13} & D_{14} & D_{15} & D_{16} & D_{17} & D_{18} & D_{19} \\ D_{20} & D_{21} & D_{22} & D_{23} & D_{24} & D_{25} & D_{26} & D_{27} & D_{28} & D_{29} \end{bmatrix} \begin{bmatrix} R \\ G \\ B \\ R^2 \\ G^2 \\ B^2 \\ RG \\ GB \\ BR \\ 1 \end{bmatrix} \quad (5)$$

Color conversion values are calculated by dividing the RGB color space into equal portions at right angles to each axis and finding C, M, and Y values corresponding to the RGB coordinates of each division grid point.

The pulse width selection table, gradation correction table, and color conversion table are created in that order. That is, these tables are sequentially created, one which has the lowest degree of freedom and can be created according to the simplest policy first, and then tables which have higher degree of freedom are created, taking the already created table into account. Although the number of gradation levels is limited to, for example, 16, a pulse width selection table is created according to a simple, easy-to-keep rule that a laser drive pulse width is assigned so that the record area rate linearly changes for each level. Thus, gradation resolution can be kept good over the entire density range.

Based on patch data stored in the storage area using such an arrangement, patch image data is output, and patch data is extracted from reading patch data read by a scanner or the like from a reading patch image formed according to the patch image data. An image processing apparatus which makes gradation correction best suited for the equipment possible is provided by estimating record gradation from the patch data. Moreover, a digital copying machine using the image processing apparatus provides high gradation and color reproducibility.

Because image processing controlling means are provided which switch input γ characteristics set for ordinary copying to linear input γ characteristics during preprocessing preceding patch data extraction, the present invention makes it possible to estimate the area rate necessary for table creation with high accuracy when a patch image is read using a scanner to create pulse width selection table and a gradation correction table.

As previously described, the present invention makes it possible to estimate gradation more accurately by selecting gradation information, such as the area rate, gradation density, or a combination of these, from patch data as the case may be and referring to created tables. Thus, gradation characteristic variations from equipment to equipment are corrected accurately, providing a color image processing apparatus which allows gradation and color to be reproduced well.

Based on a gradation estimated in such a manner, image processing parameter tables, that is, a pulse width selection table, a gradation correction table, and a color conversion table are created in that order. By doing so, the adjustable parameter tables can be dispersively provided at a plurality of key points in an image processing flowchart to create each table according to a relatively simple target or rule, so that image processing parameters can easily be obtained to reproduce gradation and color well.

Because image processing controlling means are provided which switch input γ characteristics set for ordinary copying to linear input γ characteristics during preprocessing preceding patch data extraction, the present invention makes it possible to estimate the area rate necessary for table creation with high accuracy when a patch image is read using a scanner to create pulse width selection table and a gradation correction table.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A color image forming apparatus comprising:
   a color scanner, wherein the color scanner is configured to read a color image from an original, and wherein the color scanner is configured to output color image data;
   a color printer configured to form an image on a recording medium in accordance with the color image data;
   a patch image creator that is configured to create a patch image on the recording medium in accordance with a patch data stored in a storage area, by using the color printer;
   a patch data extractor that is configured to extract read patch data from image data obtained by reading the patch image formed by the patch image creator, using the color scanner;
   a gradation estimating processor that is configured to estimate record gradation of the patch data on the basis of the read patch data extracted by the patch data extractor; and
   a correction processor that is configured to correct an input color image signal on the basis of the record gradation estimated by the gradation estimating processor and the patch data stored in the storage area;
   wherein the color printer is configured to form an image on the recording in accordance with the color image signal corrected and output from the correction processor.

2. The color image forming apparatus according to claim 1, further comprising:
   a pulse width selection table setter that is configured to:
      estimate the record gradation of the patch data on the basis of the read patch data extracted by the patch data extractor; and
      set a pulse width selection table on the basis of the estimated record gradation and the patch data stored in the storage area; and
   a pulse width output device that is configured to:
      select a pulse width based on the pulse width selection table set by the pulse width selection table setter; and
      output an input color image signal in accordance with the selected pulse width.

3. The color image forming apparatus according to claim 2, wherein pulse width selection table setter is configured to:
   change ordinary input γ characteristic settings to linear settings;
   preprocess the read patch data extracted by the patch data extractor;
   estimate the record gradation of the patch data from the preprocessed read patch data; and
   set the pulse width selection table on the basis of the estimated record gradation and the patch data stored in the storage area.

4. The color image forming apparatus according to claim 1, further comprising:
   a gradation correction table setter that is configured to:
      estimate the record gradation of the read patch data on the basis of the read patch data extracted by the patch data extractor; and
      set a gradation correction table on the basis of the estimated record gradation and the patch data stored in the storage area; and
   a gradation correction output device that is configured to:
      correct the gradation of an input color image signal on the basis of the gradation correction table set by the gradation correction table setter;
      output the corrected color image signal.

5. The color image forming apparatus according to claim 4, wherein the gradation correction table setter is configured to:
change ordinary input γ characteristic settings to linear settings;
preprocess the read patch data extracted by the patch data extractor;
estimate the record gradation of the read patch data from the preprocessed read patch data; and
set the gradation correction table on the basis of the estimated record gradation and the patch data stored in the storage area.

6. The color image forming apparatus according to claim 1, further comprising:
a pulse width selection table setter that is configured to:
estimate the record gradation of the patch data on the basis of the read patch data extracted by the patch data extractor;
set a pulse width selection table on the basis of the estimated record gradation and the patch data stored in the storage area;
a second patch image output device that is configured to output second patch image data corresponding to the patch data, by using the pulse width selection table set by the pulse width selection table setter for creating a gradation correction table;
a second storage area that is configured to store the gradation correction table;
a second patch data extractor that is configured to:
receive second read data obtained by reading a second patch image that is formed corresponding to the second patch image data output from the second patch image output device; and
extract second read patch data from the second patch image;
a second gradation estimator that is configured to estimate gradation of the second read patch data on the basis of the second read patch data extracted by the second patch data extractor;
a gradation correction table setter that is configured to set a gradation correction table on the basis of the record gradation of the second read patch data estimated by the second gradation estimator and the second patch data,
wherein the correction processor is configured to:
correct the input color image signal on the basis of the pulse width selection table set by the pulse width selection table setter and the gradation correction table set by the gradation correction table setter; and
output the corrected input color image signal.

7. The color image forming apparatus according to claim 1, wherein the gradation estimating processor is configured to:
determine C, M, Y, and K record area rates on the basis of the read patch data; and
estimate the record gradation of the patch data on the basis of the C, M, Y and K record area rates.

8. The color image forming apparatus according to claim 1, wherein the gradation estimating processor is configured to:
determine C, M, Y, and K record densities on the basis of the read patch data; and
estimate the record gradation of the patch data on the basis of the C, M, Y and K record densities.

9. The color image forming apparatus according to claim 1, further comprising:
a density estimator that is configured to estimate a density based on the read patch data; and
an area rate estimator that is configured estimate an area rate based on the read patch data;
wherein the gradation estimating processor is configured to:
estimate the record gradation of the patch data by receiving the estimated density and the estimated area rate; and
output one of the estimated density and the estimate area rate.

10. A method for color image processing, the method comprising the steps of:
outputting, using a patch image output device, patch image data generated from patch data stored in a storage area;
receiving, using a patch data extractor, read data obtained by reading a patch image which is formed corresponding to the patch image data output from the patch image data output device;
extracting, using the patch data extractor, a read patch data from the read data;
estimating, using a gradation estimator, a record gradation of the patch data on the basis of the read patch data extracted by the patch data extractor;
correcting, using a correction output device, an input color image signal on the basis of the record gradation estimated by the gradation estimator and the patch data stored in the storage area; and
outputting, using the correction output device, the corrected input color image signal.

11. The method according to claim 10, wherein the steps of estimating and correcting include:
estimating, using a pulse width selection table setter, the record gradation of the patch data on the basis of the read patch data extracted by the patch data extractor;
setting, using the pulse width selection table setter, a pulse width selection table on the basis of the estimated record gradation and the patch data stored in the storage area;
outputting, using a second patch image output device, second patch image data corresponding to the second patch data, by using the pulse width selection table set by the pulse width selection table setter for creating a gradation correction table;
storing the gradation correction table in a second storage area;
receiving, using a second patch data extractor, second read data obtained by reading a second patch image which is formed corresponding to the second patch image data output from the second patch image output device;
extracting, using the second patch data extractor, second read patch data from the second patch image;
estimating, using a second gradation estimator, gradation of the second read patch data on the basis of the second read patch data extracted by the second patch data extractor;
setting, using a gradation correction table setter, a gradation correction table on the basis of the record gradation of the second read patch data estimated by the second gradation estimator and the second patch data;
correcting, using the correction output device, the input color image signal on the basis of the pulse width selection table set by the pulse width selection table setter and the gradation correction table set by the gradation correction table setter; and outputting, using the correction output device, the corrected input color image signal.

12. The method according to claim 10, wherein the step of estimating using the gradation estimator includes:

determining, using the gradation estimator, C, M, Y, and K record area rates on the basis of the read patch data; and estimating, using the gradation estimator, the record gradation of the patch data on the basis of the C, M, Y and K record area rates.

13. The method according to claim 10, wherein the step of estimating using the gradation estimator includes:

determining, using the gradation estimator, C, M, Y, and K record densities on the basis of the read patch data; and estimating, using the gradation estimator, the record gradation of the patch data on the basis of the C, M, Y and K record densities.

14. The method according to claim 10, wherein the step of estimating using the gradation estimator includes:

estimating, using a density estimator, a density based on the read patch data;

estimating, using an area rate estimator, an area rate based on the read patch data;

estimating, using the gradation estimator, the record gradation of the patch data by receiving the estimated density and the estimated area rate; and outputting, using the gradation estimator, one of the estimated density and the estimate area rate.

15. The method according to claim 10, wherein the step of estimating using the gradation estimator includes:

receiving a plurality of pieces of estimated gradation information from a plurality of gradation estimators estimating record gradation on the basis of the read patch data; and selecting and outputting one of the pieces of estimated gradation information.

16. The method according to claim 10, wherein the steps of estimating and correcting include:

estimating, using a pulse width selection table setter, the record gradation of the patch data on the basis of the read patch data extracted by the patch data extractor;

setting, using the pulse width selection table setter, a pulse width selection table on the basis of the estimated record gradation and the patch data stored in the storage area;

selecting, using a pulse width output device, a pulse width based on the pulse width selection table set by the pulse width selection table setter; and outputting, using the pulse width output device, an input color image signal in accordance with the selected pulse width.

17. The method according to claim 11, wherein the step of estimating using the pulse width selection table setter includes:

changing ordinary input γ characteristic settings to linear settings;

preprocessing the read patch data extracted by the patch data extractor;

estimating the record gradation of the patch data from the preprocessed read patch data; and setting the pulse width selection table on the basis of the estimated record gradation and the patch data stored in the storage area.

18. The method according to claim 10, wherein the steps of estimating and correcting include:

estimating, using a gradation correction table setter, the record gradation of the read patch data on the basis of the read patch data extracted by the patch data extractor;

setting, using the gradation correction table setter, a gradation correction table on the basis of the estimated record gradation and the patch data stored in the storage area;

correcting, using a gradation correction output device, the gradation of an input color image signal on the basis of the gradation correction table set by the gradation correction table setter; and outputting, using the gradation correction output device, the corrected color image signal.

19. The method according to claim 18, wherein the step of estimating using the gradation correction table setter includes:

changing ordinary input γ characteristic settings to linear settings;

preprocessing the read patch data extracted by the patch data extractor;

estimating the record gradation of the read patch data from the preprocessed read patch data; and setting the gradation correction table on the basis of the estimated record gradation and the patch data stored in the storage area.

20. A color image forming apparatus comprising:

a color scanner for reading a color image from an original and outputs color image data;

a color printer for forming an image on a recording medium in accordance with the color image data;

patch image forming means for forming a patch image on the recording medium in accordance with a patch data stored in storage areas, by using the image forming means;

patch data extracting means for extracting read patch data from image data obtained by reading the patch image formed by the patch image forming means, using the color scanner;

gradation estimating means for estimating record gradation of the patch data on the basis of the read patch data extracted by the patch data extracting means;

correction output means for correcting an input color image signal on the basis of the record gradation estimated by the gradation estimating means and the patch data stored in the storage area; and forming means for forming an image on a recording medium, using a color printer, in accordance with the color image signal corrected and output from the correction output means.

* * * * *